United States Patent

[11] 3,571,554

| [72] | Inventor | Jean Baujoin |
| | | Meudon, France |
| [21] | Appl. No. | 791,411 |
| [22] | Filed | Jan. 15, 1969 |
| [45] | Patented | Mar. 23, 1971 |
| [73] | Assignee | Compagnie Generale D'Electricite |
| | | Paris, France |
| [32] | Priority | Jan. 15, 1968 |
| [33] | | France |
| [31] | | 135,924 |

[54] LASER TOOL
2 Claims, 3 Drawing Figs.

[52] U.S. Cl. .................................................. 219/121,
250/205
[51] Int. Cl. ..................................................... B23k 9/00
[50] Field of Search ......................................... 356/4, 5;
219/121 (EB), 121 (LASER)

[56] References Cited
UNITED STATES PATENTS

| 2,746,420 | 5/1956 | Steigerwald................. | 219/121X |
| 3,174,026 | 3/1965 | Bowers et al. ............... | 219/121X |
| 3,229,095 | 1/1966 | Lasher et al. ................ | 219/121X |
| 3,259,730 | 7/1966 | Wehde et al. ................ | 219/121X |
| 3,369,101 | 2/1968 | DiCurcio...................... | 219/121 |
| 3,378,446 | 4/1968 | Whittlesey.................... | 219/121X |
| 3,437,820 | 4/1969 | Thompson, Jr.; et al. .... | 356/5X |

*Primary Examiner*—Richard A. Farley
*Assistant Examiner*—Joseph G. Baxter
*Attorney*—Sughrue, Rothwell, Mion, Zinn & MacPeak ABSTRACT: An optical system employed by a laser tool having multiple laser heads for combining corresponding laser beams and concentrating the same at a single point with a fine film of material disposed between the point and the optical system to protect the same.

LASER TOOL

BACKGROUND OF THE INVENTION

1. Field of the Invention

This invention relates to laser tools and more particularly to those tools involving at least two laser heads for providing a concentrated high energy laser beam at a single focal point for machining, boring or welding workpieces, etc.

2. Description of the Prior Art

The laser is employed as an operating instrument particularly in the machining field in connection with welding, boring and cutting of various materials, particularly very resistant materials, such as tungsten. The energies required in these machining operations are considerable and the small energy output of the individual laser heads makes it necessary to find more improved arrangements for widening the field of application of laser tools.

SUMMARY OF THE INVENTION

The present invention is directed to a laser tool comprising at least two laser heads in association with optical means which combines the beams of the individual laser heads into a single light beam which is then concentrated at a given point. A fine film of material for the protection of the optical system is disposed between the system and the point of concentration of the laser beams.

The present invention provides the possibility of combining several beams of different energy and having varying pulse durations and forms. In such an arrangement, the consumption of energy is decidedly lower than that necessary for obtaining the same output effective energy from a single laser emitting a pulse of long duration. In the arrangement of the present invention the laser tool may have a much higher firing rate which permits each of the laser bars or each of the lighting tubes to be cooled for a much longer period.

DESCRIPTION OF THE PREFERRED EMBODIMENTS

Figure 1:
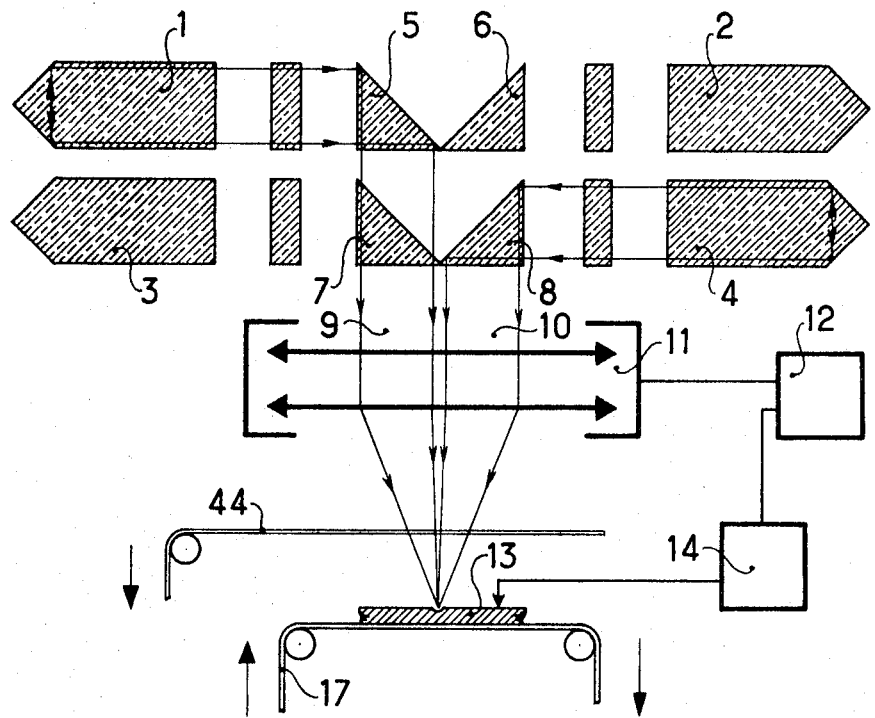
FIG. 1 is a diagrammatic view of a first embodiment of the present invention.

In the embodiment of FIG. 1, four individual laser heads 1, 2, 3 and 4, which for example may be ruby lasers emitting a radiation of which the wavelength is 6943 A. are so arranged to produce, with respect to the deviating optical systems 5, 6, 7 and 8, two parallel beams 9 and 10 which preferably fall at normal incidence angles onto an optical system 11 of variable focal length, conventionally known as a "Zoom" lens system.

The focal length of the optical system 11 may be adjusted to a constant given value, depending upon tool requirement, particularly in the case where the tool serves in a welding function. Where the tool is used as a boring or drilling machine, the focal length of the optical system 11 must be programmed as a function of the speed of penetration of the light beam into the material forming the workpiece being drilled or cut. The variation of the focal length may be effected by any mechanical means 12 which, for example, may be a step-by-step motor.

In the case where the laser tool according to the present invention serves a cutting purpose, it is possible to adjust the focal length as a function of the thickness of the workpiece 13 being cut, and for irregular profiles, as a function of the distance of the workpiece 13 from the lens 11. The regulating and control arrangement of the focal length may be controlled by any pickup device, such as that shown diagrammatically at 14, which is adapted to measure the parameters (distances, thickness, etc.). This control or regulating means can, for example, be photoelectric in nature.

The tool according to the invention comprises a device which is shown diagrammatically at 17 in FIG. 1, which is adapted to cause the driving of the workpieces to be machined. It is to be noted that it is possible to use an arrangement other than the combination of prisms 5, 6, 7 and 8 to direct the light beam emanating from the various laser heads. There are in existence various arrangements making it possible to combine four or more beams into a single laser beam, which would be incident on the entry face of the variable focal length system 11. The beams emitted by the lasers 1 to 4 are not strictly parallel and have a certain divergence. Further, it is known that the dimension of the image obtained in the focal plane of the arrangement 11 will have a dimension of the order of $f.\theta$, $f$ being the focal length and $\theta$ being the divergence of the laser beam.

The calculation of the dimensions of the light spot obtained in the focal plane of the system 11 must therefore take these considerations into account and in addition the fact that, in such optical systems, the effective surface of a lens is limited to a ray circle whose diameter D is equal to $f/N$, N being the number characterizing the aperture of the apparatus diaphragm. The theoretical minimum value for N is 0.5, but in practice it is equal to 1. Consequently, the optical systems are such that the effective surface of a lens has a diameter $D=f$.

Figure 2:
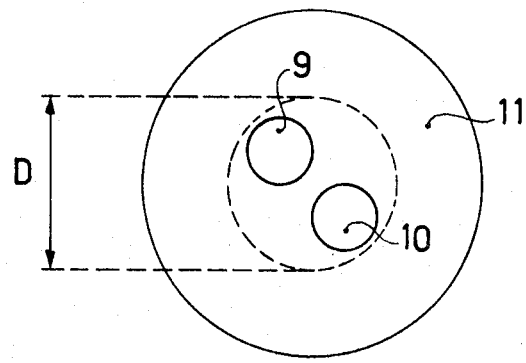
FIG. 2 is a schematic view of the relationship between the light spots on the entry face of the optical system 11 and its components.

FIG. 2 represents a view of the entry lens of the variable focal length system 11, the large circle representing the periphery of the entry lens and the circle in broken lines representing the effective surface of the diameter D. The circles 9 and 10 represent the beams 9 and 10 which form light spots due to emission of the beams by lasers 1 and 4 of FIG. 1. It is thus seen that these spots must have a diameter smaller than D/2 in order to obtain the best possible efficiency for the optical system 11.

Figure 3:
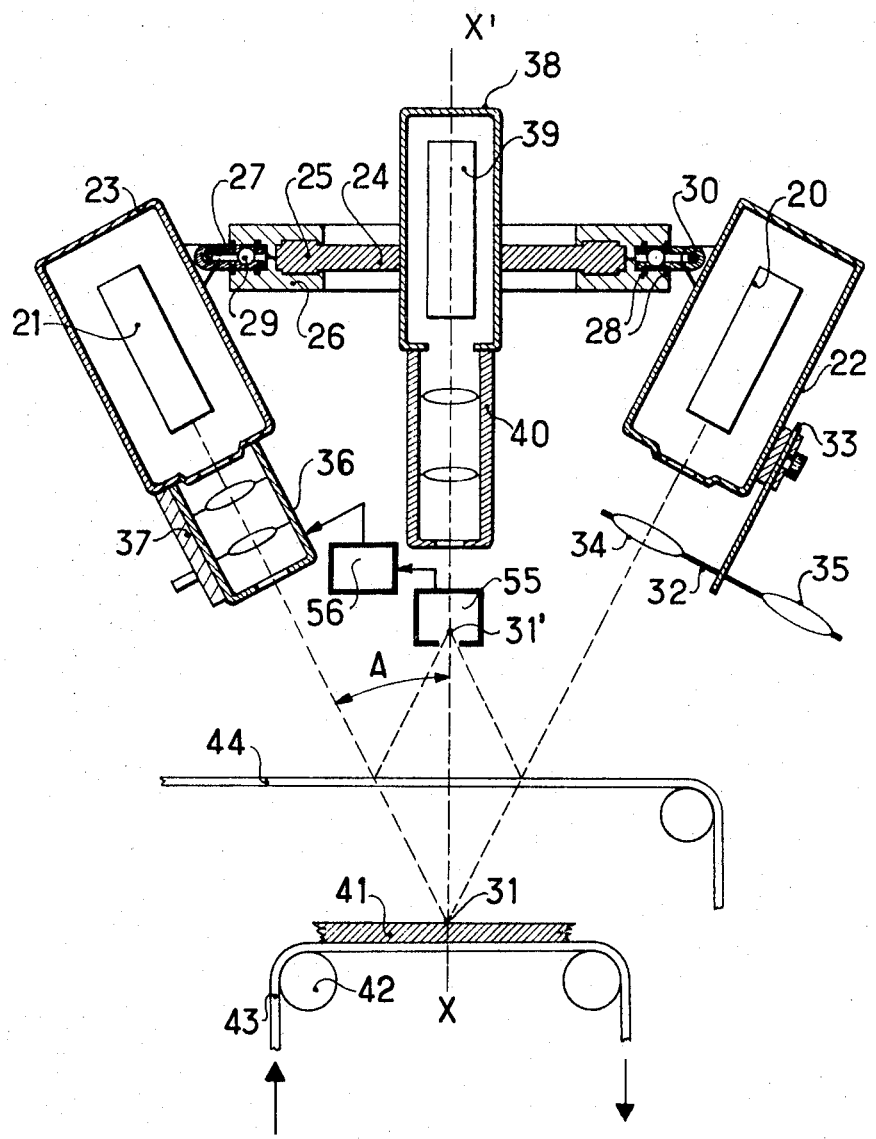
FIG. 3 is a diagrammatic view, partially in section, of another embodiment of a laser tool according to the present invention.

Turning to FIG. 3, there is shown a diagrammatic view, partially in section, of another embodiment of a laser tool according to the present invention. The tool illustrated in FIG. 3 comprises a plurality of laser heads, such as 20 and 21, arranged on a support in such a way that the light beams meet at a single point 31. By way of example, the tool can comprise four laser heads disposed on the surface of a cone with the axis X—X' having a half-angle A at the apex.

The support can comprise, for example, a central disc or member 24 carrying a crown or ring 25, along which slides a member 26. Member 26 comprises a guide means 28 within which slides a rod 27 which may be fixed in position by means of locking screw 29. The end 30 of rod 27 is fixed to the casing 23 of laser 21 and, by means of a ball joint which can be locked, allows the orientation of the laser to be regulated at will.

The lasers 20 and 21 each comprise an optical system of variable focal length which may, for example, comprise a rotating plate 32, the axis of which can be displaced with translatory motion by sliding the same relative to a lockable support 33. The rotating plate 32 may carry a plurality of lenses, such as those shown at 34 and 35, having different focal lengths. Alternatively, the variable focal length optical system may comprise a system known conventionally as a "Zoom" lens, such as that shown diagrammatically by block 36 which is fixed to the output end of casing 23 of laser 21. The variable focal length systems may be manually or electrically controlled and the manner indicated symbolically at 37.

The laser tool according to FIG. 3 may in addition include a supplementary casing 38, aligned with the axis of the cone defined by the rays emitted by lasers 20 and 21. This casing comprises a light source 39 associated with a variable focal length optical system 40. The light source 39 may be any light source which emits a fine pencil of visible light which serves to illuminate the points 31 of the material forming workpiece 41. This illumination may be continuous or used only for adjusting the alignment of the beams from the lasers, such as 20 and 21, which can work with rays having a wavelength in the invisible part of the spectrum.

According to a variant, the light source 39 may comprise a laser, preferably a continuously operating laser which emits a radiation serving to preheat the elements to be machined.

It is to be understood, that the tool according to the present invention may comprise any known means to position and to cause the elements forming the workpieces to be machined by moving the same into the focal plane of the optical system, such means indicated schematically at 42 and 43 as a belt-type conveyor. As such, the laser control means 32, 40 and 37 are in themselves conventional. Further in accordance with the present invention, known means per se are used for controlling and regulating the individual lasers.

In FIG. 3, only two laser heads 20 and 21 are shown for providing the individual laser beams operating on the workpiece. It is, however, evident that it is possible to use any number of lasers disposed in any manner on the circumference of the half-angle cone as defined above.

The tool illustrated in FIGS. 1 and 3 has a principal feature of the present invention and further includes protection means for protecting the optical system or systems from any projections of molten material emanating from the workpieces undergoing machining or other operations. Protection is achieved specifically, by the movement of a transparent protective screen 44 which is disposed between the optical systems such as 37 and 40, FIG. 3, and the point of beam concentration 31 at the workpiece. This screen, which may be easily formed of a "mylar" sheet of a thickness of a few hundredths of millimeters, is destroyed in punctiform manner by the laser beams, but its operation nevertheless prevents molten particles from impinging on the optical systems which are normally very close to the workpiece, in view of the fact that the focal lengths are relatively small.

The use of a moving screen, such as "mylar" sheet 44, can in addition solve another problem present under the arrangements shown in FIG. 3. If the screen is made of transparent material having a known reflection coefficient, a part of the incident beam will be reflected to a point such as 31' which is symmetrical with respect to point 31 in relation to the transparent screen 44. The quantity of reflected energy focused at point 31' may be easily calculated and is a known fraction of the energy concentrated at point 31 at the workpiece. As a consequence, by arranging a detector 55, for example a calorimeter, it is possible to continuously measure the energy available at point 31 and to use the results of this measurement for regulating the power of the tool, for example either manually or automatically by the means shown diagrammatically at 56 to adjust laser 21 by the adjustment of the variable focal length systems 36 associated with this laser.

The advantages of the tool according to the invention may be best understood from a consideration of the following numerical example: using the prior art, it is possible to fairly easily obtain output energies in the form of an electromagnetic beam of 10 Joules, distributed over a time of 10 ms and involving a pumping energy of 2 $kj$.

On the other hand, a laser tool according to the present invention which comprises four laser heads makes it possible to obtain, at the working point, an energy of an arbitrary value extending up to 40 Joules with total pulse periods which can vary up to a value of 40 ms, depending on the regulation of the focusing arrangement, the number of heads effectively employed, and the moments of triggering each of the laser heads.

The repetition rate of the laser firings is on the order of fractions of a second; in the case of the arrangement according to the present invention, by successively programming the triggering of the laser heads, it is possible to obtain a faster laser firing rate while allowing sufficient time for the heads to be cooled, and this is very important to the efficiency of the active material, such as the bars and the flash of the laser heads.

Another advantage is the energy yield of the tool. An energy of 40 Joules for 40 ms requires, with the tool according to the present invention, a pump energy equal to 8 $kj$, while obtaining the same result with a single head requires a pump energy on the order of 32 $kj$, that is to say, an expenditure of energy which is 4 times as great. This is due to the fact that the lighting tubes cannot support an energy higher than 100 j/cc/ms. It is thus necessary to lengthen the lighting tubes and at the same time to increase the length of the laser bars. Furthermore, as the total energy to be obtained for a single laser must be 4 times as great, the exit surfaces of the bars must consequently be 4 times as large.

Since the pumping energy is, with good approximation, proportional to the volume of the bars, the pumping energy necessary in the case where four laser heads are used is: $Wp_4 = k(S \times 4L)$, where S is the output section of the bars, L their length. In the case of a single head, it would have to be $Wp_1 = k(4S \times 4L)$, and this gives the relationship between the two energies: $Wp_4 = Wp_1/4$.

It is obvious that the invention is in no way limited to the embodiments described and illustrated, which are only given by way of example. In particular, it is possible, without departing from the scope of the invention, to incorporate modifications as regards detail, to change certain arrangements or to replace certain means by equivalent means.

I claim:

1. In a laser tool including a plurality of laser heads and an optical system for combining the individual laser beams of each laser head into a single laser beam concentrated at one point, the improvement comprising: a fine film of transparent material for protecting the optical combining system, said material being easily destructible by said laser beams and being disposed between said optical combining system and the point of concentration of said laser beams, and means for continuously moving said fine film of transparent material tranversely with respect to said optical combining system.

2. The laser tool as claimed in claim 1 wherein said film of material partially reflects said laser beams and said tool further includes a photosensitive detector operatively disposed for receiving a portion of said partially reflected light to give a measurement representative of the useful energy supplied by said laser heads and concentrated at said point.